(12) United States Patent
Myers et al.

(10) Patent No.: US 11,636,252 B1
(45) Date of Patent: Apr. 25, 2023

(54) ACCESSIBILITY PLATFORM

(71) Applicant: Express Scripts Strategic Development, Inc., St. Louis, MO (US)

(72) Inventors: Christopher M. Myers, Dublin, OH (US); Tatyana Feinstein, Austin, TX (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 195 days.

(21) Appl. No.: 17/000,522

(22) Filed: Aug. 24, 2020

(51) Int. Cl.
G06F 40/14 (2020.01)
G06N 20/00 (2019.01)
G06F 16/958 (2019.01)
G06F 16/957 (2019.01)

(52) U.S. Cl.
CPC ............ G06F 40/14 (2020.01); G06F 16/958 (2019.01); G06F 16/9577 (2019.01); G06N 20/00 (2019.01)

(58) Field of Classification Search
None
See application file for complete search history.

(56) References Cited

U.S. PATENT DOCUMENTS

| | | | | |
|---|---|---|---|---|
| 8,886,636 | B2* | 11/2014 | Gabrilovich | G06F 16/36 707/723 |
| 10,769,381 | B2* | 9/2020 | Tacchi | G06F 16/9024 |
| 2002/0065653 | A1* | 5/2002 | Kriechbaum | G10L 15/187 704/E15.02 |
| 2005/0171762 | A1* | 8/2005 | Ryan | G16H 15/00 704/200 |
| 2008/0177786 | A1* | 7/2008 | Faisman | G06F 16/40 |
| 2014/0123303 | A1* | 5/2014 | Shukla | G06F 21/6254 726/26 |
| 2016/0055427 | A1* | 2/2016 | Adjaoute | G06N 20/00 706/12 |
| 2016/0335549 | A1* | 11/2016 | Ahuja-Cogny | G06F 8/40 |
| 2016/0350108 | A1* | 12/2016 | Joo | G06F 40/242 |
| 2018/0032915 | A1* | 2/2018 | Nagaraju | G06V 10/94 |
| 2018/0322396 | A1* | 11/2018 | Ahuja-Cogny | G06N 5/022 |
| 2019/0065462 | A1* | 2/2019 | Salloum | G06F 40/44 |
| 2019/0205919 | A1* | 7/2019 | Goksel | G06Q 30/0244 |
| 2019/0236490 | A1* | 8/2019 | Harang | G06N 20/00 |
| 2019/0272827 | A1* | 9/2019 | Vozila | G16H 15/00 |
| 2020/0019567 | A1* | 1/2020 | Moo | G06Q 30/0201 |
| 2020/0133964 | A1* | 4/2020 | Lee | G06F 16/355 |
| 2020/0175962 | A1* | 6/2020 | Thomson | G06F 40/279 |
| 2020/0293604 | A1* | 9/2020 | Nelson | G06N 20/00 |
| 2021/0182355 | A1* | 6/2021 | Wiley | G06F 16/957 |

* cited by examiner

*Primary Examiner* — Nathan Hillery
(74) *Attorney, Agent, or Firm* — Schwegman Lundberg & Woessner

(57) ABSTRACT

Methods and systems for an accessibility system are provided. The methods and systems include operations comprising: receiving a request for a markup language document; obtaining the markup language document; processing a first portion of the markup language document with a machine learning technique to generate a first dictation corresponding to the first portion of the markup language document, the machine learning technique being trained to establish a relationship between a plurality of training markup language documents and training dictations corresponding to the training markup language documents; and replacing the first portion of the markup language document with the first dictation.

19 Claims, 13 Drawing Sheets

ACCESSIBILITY PLATFORM

BACKGROUND

Users are increasingly using the Internet, such as websites, to access information and perform transactions. As companies start to shift their operations more online, enabling users who are visually impaired to perform transactions online becomes important. Given that websites mainly include visual content, useful transcription services are needed to assist users with disabilities to navigate such websites.

BRIEF DESCRIPTION OF THE DRAWINGS

FIG. 9 is an example website that is transcribed, according to example embodiments.

DETAILED DESCRIPTION

Figure 1:
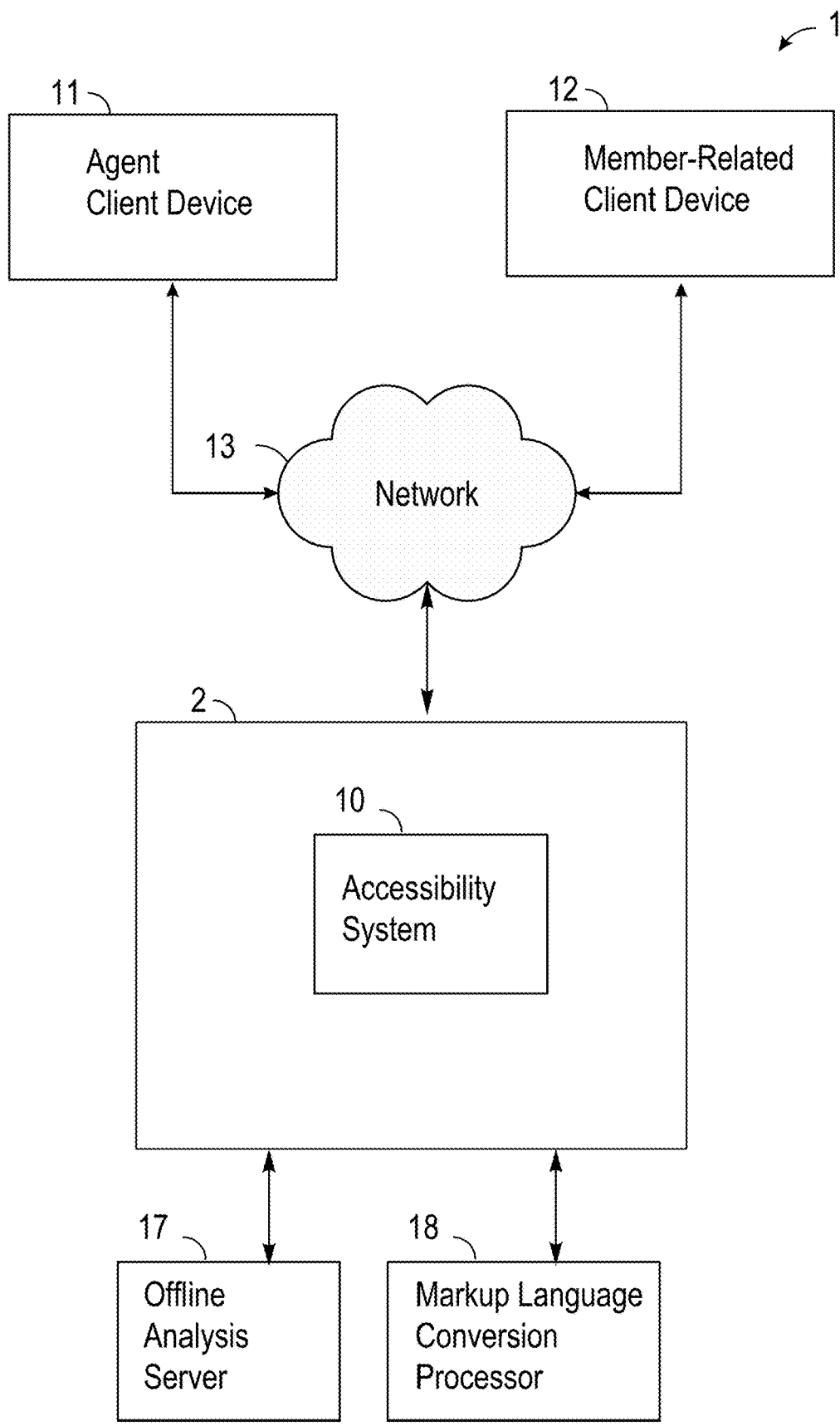
FIG. 1 is a block diagram of an example accessibility system, according to some embodiments.

Example methods and systems for an accessibility system, such as a visually impaired website are described. In the following description, for purposes of explanation, numerous specific details are set forth in order to provide a thorough understanding of example embodiments. It will be evident, however, to one of ordinary skill in the art that embodiments of the invention may be practiced without these specific details.

As online transactions become commonplace, allowing users who are visually impaired to perform such transactions becomes increasingly more important. Websites includes a vast array of visual content that is organized and distributed non-uniformly throughout a webpage. Given the many different ways content can be presented on a webpage, a user cannot be trained to learn how to navigate all websites in a particular manner. Some entities generate visually accessible versions of websites by manually replacing certain visual elements with audible versions. However, creating two versions of a website (one that is visually accessible and one that is not) is very time consuming and expensive. As such, entities usually avoid the time and expense needed to generate visually accessible websites.

Typical website transcription services exist. These services obtain the markup language of a website and convert whatever text exists in the markup language document to speech form without providing any specific context. While such systems can generally describe the contents of a website to a user, the systems can produce incomprehensible transcriptions in many cases given the systems lack of intelligence and using a brute force, sequential transcription of the web page code. For example, the transcription services may indicate that a certain set of buttons exist on the webpage in a difficult to understand and non-natural manner and without providing other context for the buttons. Accordingly, such services typically go unused and leave visually impaired users with limited other options for navigating websites.

The disclosed embodiments provide systems and methods to generate a markup language document suitable for presentation to users who are visually impaired. Specifically, the disclosed embodiments receive a request for a markup language document, such as a website at a particular address or universal resource locator (URL). The disclosed embodiments obtain the markup language document corresponding to the requested website and process a first portion of the markup language document with a machine learning technique, such as a recurrent neural network or a bi-directional long short-term memory (LTSM) neural network. The machine learning technique is trained to establish a relationship between a plurality of training markup language documents and training dictations corresponding to the training markup language documents. The machine learning technique generates a first dictation corresponding to the first portion of the markup language document and replaces the first portion of the markup language document with the first dictation.

In this way, rather than blindly transcribing textual portions of a website, the disclosed embodiments intelligently generate dictations for select portions of the website using a machine learning technique specifically trained to dictate such portions. This provides a more natural presentation of visual contents of a website to a visually impaired user without an entity generating a specific visually accessible version of its website. As a result, the time and expense needed to generate visually accessible websites is reduced or entirely avoided and access to a vast array of websites is widely made available to users who are visually impaired.

FIG. 1 is a block diagram showing an example system 1 according to various exemplary embodiments. The system 1 can be an accessibility system, such as a visually impaired website system, that includes a website transcription server system 2, an agent client device 11, and a member-related client device 12 that are communicatively coupled over a network 13 (e.g., Internet, telephony network).

The agent client device 11 and the member-related client device 12 can be communicatively coupled via an audio call (e.g., VoIP, Public Switched Telephone Network, cellular communication network, etc.) or via electronic messages (e.g., online chat, instant messaging, text messaging, email, and the like). While FIG. 1 illustrates a single agent client device 11 and a single member-related client device 12, it is understood that a plurality of agent client devices 11 and a plurality of member-related client devices 12 can be included in the system 1 in other embodiments. As used herein, the term "client device" may refer to any machine that interfaces to a communications network (such as network 13) to obtain resources from one or more server systems or other client devices. The client device includes a web browser application that processes markup language documents, such as webpages received from websites, and presents content (visually or audibly) from the markup language documents to a user. A client device may be, but is not limited to, a mobile phone, desktop computer, laptop, portable digital assistants (PDAs), smart phones, a wearable device (e.g., a smart watch), tablets, ultrabooks, netbooks, laptops, multi-processor systems, microprocessor-based or programmable consumer electronics, game consoles, set-top boxes, or any other communication device that a user may use to access a network. The member-related client device 12 can include a microphone and speaker on a mobile electronic device, a telephone, or a self-service kiosk, e.g., at a pharmacy, a clinic, a doctor's office, a mobile relief center, and the like.

The network 13 may include, or operate in conjunction with, an ad hoc network, an intranet, an extranet, a virtual private network (VPN), a local area network (LAN), a wireless network, a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

In the example shown in FIG. 1, a user using the member-related client device 12 can establish a communication session with an agent associated with the agent client device 11 via a website associated with the agent client device 11. The agent can be a human agent or an automated agent, e.g., on behalf of an organization. The automated agent can be associated with a medical group that includes the member. The automated agent can be an interactive voice response (IVR), a virtual online assistant, or a chatbot provided on a website. During a communication session between the user and the agent, the customer service server system 2 identifies the member using initial context data (e.g., the phone number the member is calling from, the website login information inputted, automatic number identification (ANI), etc.) and retrieves the data on the member (e.g., member account information, name, address, insurance information, information on spouse and dependents, etc.) to be presented on a webpage on the member-related client device 12. Specifically, the agent client device 11 instructs the website transcription server system 2 to generate a markup language document based on the retrieved data to provide the markup language document for presentation to a user on the member-related client device 12.

In some cases, the website transcription server system 2 receives an indication that a user of the member-related client device 12 is visually impaired. This indication may be received by specific input from the member-related client device 12 or by referencing a profile associated with the user of the member-related client device 12. In response to receiving the indication, the website transcription server system 2 processes the markup language document with a trained machine learning technique, such as that implemented by the accessibility system 10, to generate a dictation for one or more portions of the website. The website transcription server system 2 then automatically modifies the markup language document to hide the portions for which the dictation has been generated and add to those portions the audible dictation. The website transcription server system 2 then provides the machine learning generated dictation of the website to the member-related client device 12. The member-related client device 12 presents the website or webpage of the website such that the visual content is dictated to the user audibly and the visual content is hidden from display.

In some cases, the web browser implemented on the member-related client device 12 includes a trained machine learning technique. The member-related client device 12 receives the markup language document from the website transcription server system 2 or some other website and locally processes the markup language document with the trained machine learning technique to generate the dictation for one or more portions of the website. The member-related client device 12 then automatically modifies the markup language document to hide the portions for which the dictation has been generated and add to those portions the audible dictation. The member-related client device 12 presents the website or webpage of the website such that the visual content is dictated to the user audibly and the visual content is hidden from display.

In some cases, the agent client device 11 or the member-related client device 12 communicate with a remote markup language conversion processor 18 to generate dictations for one or more portions of a markup language document. The markup language conversion processor 18 may apply a trained machine learning technique to the markup language document to replace one or more portions of the markup language document with dictations generated by the machine learning technique. In some implementations, the markup language conversion processor 18 applies a typical text-to-speech process to transcribe certain elements of a markup language document to audible form. The markup language conversion processor 18 may combine machine learning technique generated dictations with the text-to-speech transcriptions to generate a markup language document that includes certain portions with machine learning generated dictations and others that are simple text-to-speech transcriptions. In some implementations, a confidence score is generated by the machine learning technique when generating a dictation for a portion of a markup language document. If the confidence score falls below a threshold, the portion of the markup language document is transcribed using a text-to-speech engine or process rather than using the dictation generated by the machine learning technique. If the confidence score satisfies the threshold or exceeds the threshold, the portion of the markup language document is replaced with the dictated version generated by the machine learning technique. In some implementations, if the confidence score is below the threshold, rather than using a text-to-speech transcription, the markup language document is retained in raw form and the dictation is not used. In such circumstances, the unmodified version of the markup language document is presented to the user on the member-related client device 12.

The web browser implemented on the member-related client device 12 presents the markup language document received from the website transcription server system 2 in a visually accessible form using the one or more portions of the website for which the dictation was generated and/or for which the transcription was generated.

The website transcription server system 2 in FIG. 1 includes the accessibility system 10. The website transcription server system 2 can further include elements described with respect to FIGS. 11 and 12, such as a processor and memory, having instructions stored thereon, that when executed by the processor, causes the processor to control the functions of the website transcription server system 2.

The website transcription server system 2 trains a machine learning technique implemented by the accessibility system 10 to generate dictations for certain portions of a markup language document. For example, the accessibility system 10 presents a training markup language document to a user on an agent client device 11. Input is received from the user on the agent client device 11 that selects a portion of the training markup language document to dictate. In response to receiving the input, the portion of the markup language document is extracted from the training markup language document. Input is received from the user of the agent client device 11 that includes a recording of audio verbalizing the selected portion. The recorded audio is provided to an offline analysis server 17 to convert the recorded audio to a textual dictation. The textual dictation can be incorporated in a textual document, such as a markup language document, and read out to a user. When read out to the user, the textual dictation verbalizes the speech received from the user who recorded the audio verbalizing the selected portion. This textual dictation is stored in the accessibility system 10 in association with the selected portion of the training markup language document. This association creates a pair of a training markup language document portion and a corresponding dictation. Additional pairs can be similarly generated by receiving inputs from the same or other agents using respective agent client devices 11.

The accessibility system 10 processes batches of pairs of training markup language document portion and dictations (ground-truth dictations) to train a neural network, such as Long-Short Term Memory Neural Networks (LSTM). For example, as explained in more detail in connection with FIG. 2, the neural network estimates an estimated dictation for a given training markup language document portion. The neural network compares the estimated dictation with the corresponding ground-truth dictation to generate an error. Using a loss function and based on the error, the neural network is updated and applied to another set of training markup language document portion and ground truth dictation. The neural network parameters are again adjusted and when the loss function satisfies a stopping criterion, the neural network is trained and utilized by a member-related client device 12 to generate a dictation for a given markup language document.

The website transcription server system 2 employs the accessibility system 10 to determine the effectiveness of a machine learning generated dictation versus a text-to-speech engine generated transcription. For example, the accessibility system 10 presents random or pseudo-random markup language documents to a population of users, such as on agent client devices 11 or member-related client devices 12. The markup language documents are either presented with portions of the markup language documents replaced by dictations generated by the machine learning technique implemented by the accessibility system 10 or by transcriptions generated by typical text-to-speech engines or processes. As an example, a Monte Carlo simulation is used to determine the distribution of how many of the markup language documents are replaced by dictations generated by the machine learning technique implemented by the accessibility system 10 and how many of the documents are provided with transcriptions generated by typical text-to-speech engines or processes.

Figure 4:
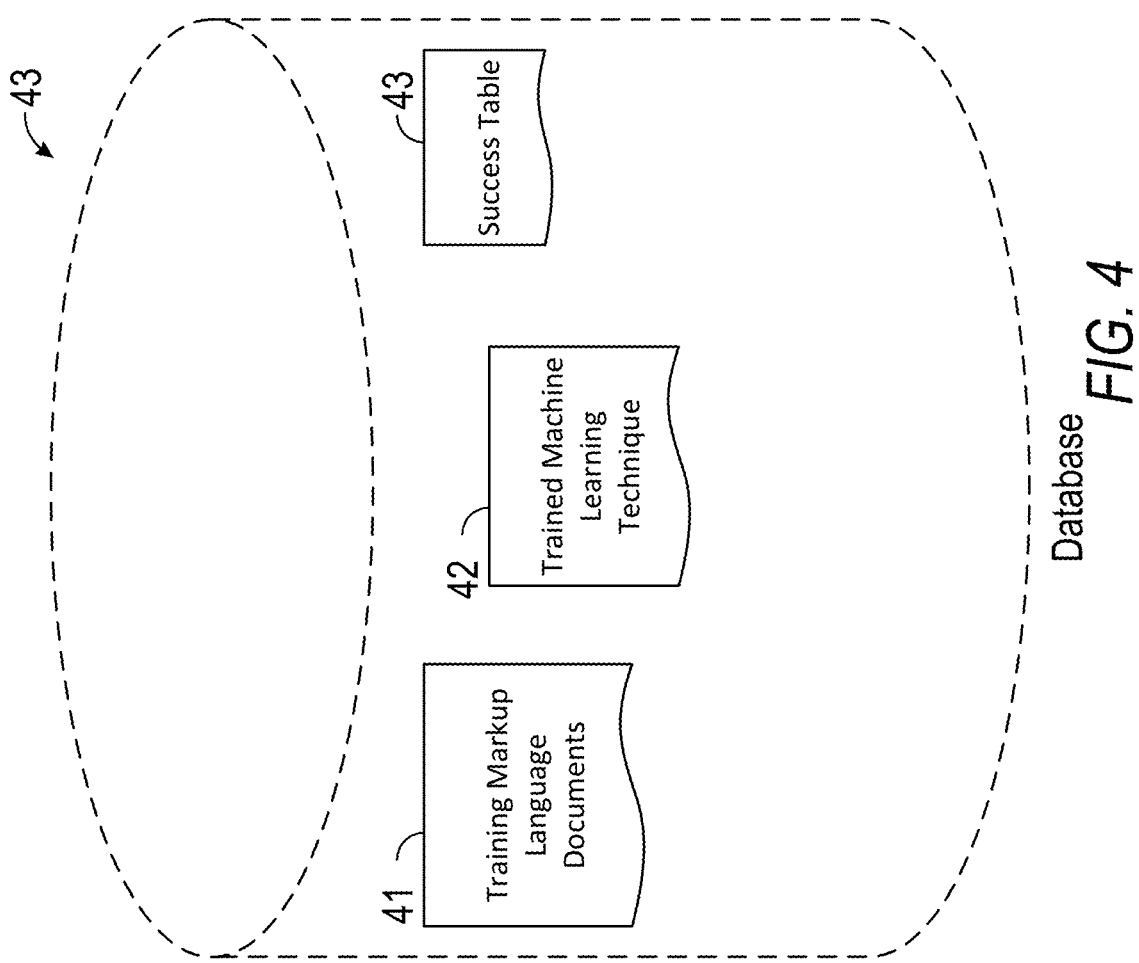
FIG. 4 is an example database that may be deployed within the system of FIGS. 1-3, according to some embodiments.

The accessibility system 10 monitors user interactions with the markup language documents presented to the users. The accessibility system 10 determines whether a given user completed a set of or all of the tasks on the webpage generated based on the markup language document. The accessibility system 10 stores a task completion criterion or percentage with each markup language document version in success table 43 of the database 43 (FIG. 4). For example, the accessibility system 10 may associate a first markup language document version that includes a first portion that has been transcribed by a typical text-to-speech engine with a first criterion or percentage. Similarly, the accessibility system 10 may associate a second markup language document version, that includes the same first portion of the first markup language document but that has been replaced with a dictated version generated by the machine learning technique of the accessibility system 10, with a second criterion or percentage. This may represent results of a survey that represents how effective the machine learning technique is at generating dictations versus text-to-speech engine generated transcriptions of the same markup language document. The survey results can be used to control whether, in real-time presentation of a website to a user on a member-related client device 12, a portion of the website is replaced with a dictation generated by the machine learning technique or by a transcription generated by a text-to-speech engine.

Figure 2:
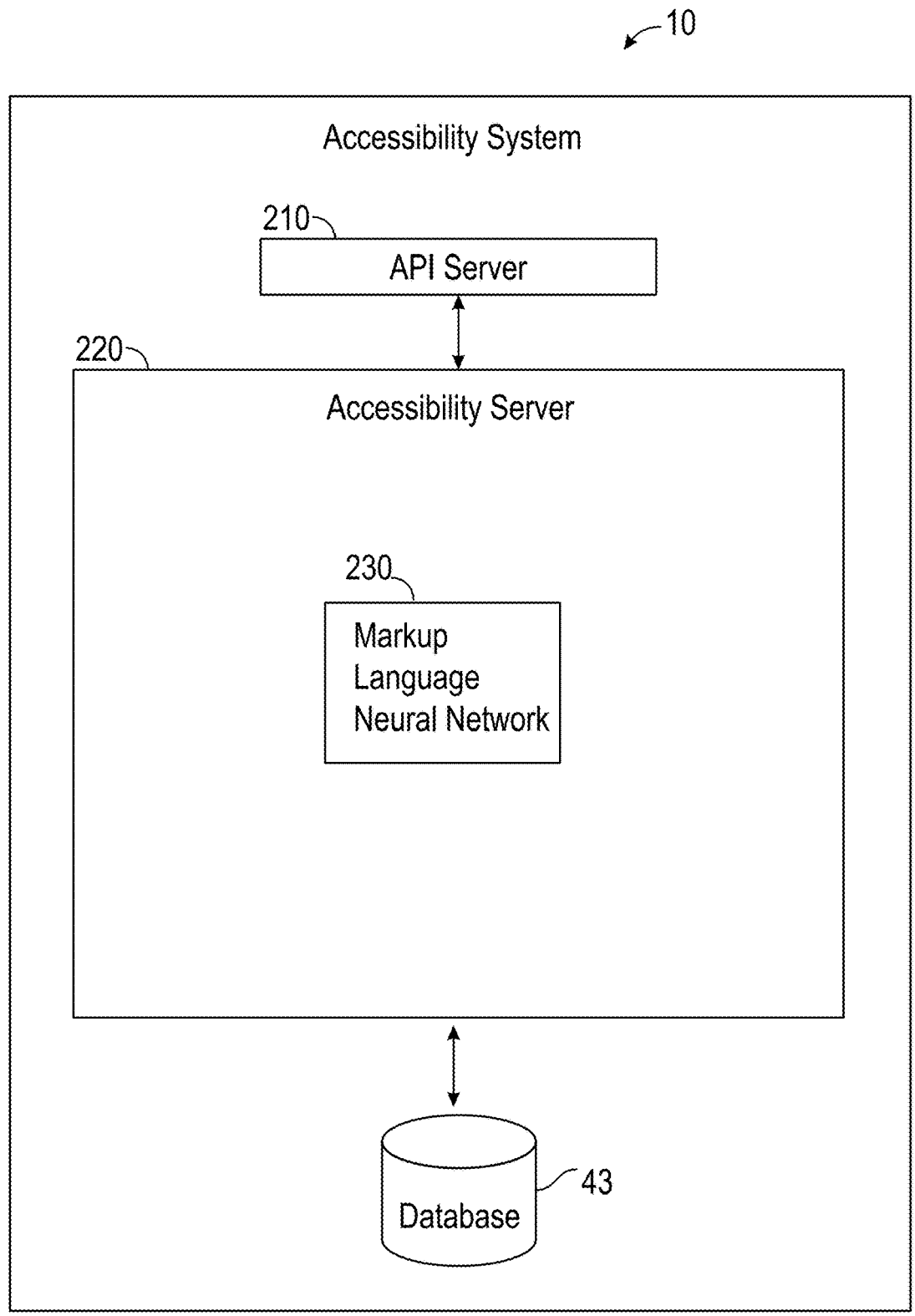
FIG. 2 is block diagram illustrating further details regarding the accessibility system, according to exemplary embodiments.

FIG. 2 is block diagram illustrating further details regarding the accessibility system 10, according to exemplary embodiments. The accessibility system 10 includes an API server 210 that is coupled to and provides a programmatic interface to an accessibility server 220. For example, the accessibility server 220, using the API server 210, receive real-time access to the communication session between the user and the agent (e.g., between devices 11, 12). The communication session can include, for example, a markup language document that is presented to a user. The accessibility server 220 may also use the API server 210 to receive the markup language document and a trained machine learning model for generating a dictation of the markup language document or portions thereof. In some cases, during training, the accessibility server 220 may also use the API server to receive audio recordings of portions of a markup language document (webpage), transcriptions of such audio recordings, generated markup language document portions representing the transcriptions, and analysis from an external system for offline processing by and training of the accessibility server 220.

The accessibility server 220 can further include speech-to-text processor (not shown) that converts or transcribes an audio signal (e.g., the audio recording reading out a portion of a webpage) into a transcribed audio signal and that generates markup language document portions representing the transcribed audio signal. During training of the machine learning model, the accessibility server 220 associates the generated markup language document portion with the original or raw markup language document to create a pair of training data. The accessibility server 220 trains a machine learning model based on the training data to estimate a markup language document portion that represents an audio transcription from a raw markup language document portion. After training the machine learning model, the accessibility server 220 can replace a portion of the markup language document with a markup language document portion generated by the trained machine learning model to provide to a user a dictated markup language document.

As shown in FIG. 2, the accessibility server 220 includes one or more neural networks including a markup language neural network 230. In one embodiment, the markup language neural network 230 is a bi-directional Long-Short Term Memory (LSTM) Neural Networks. The markup language neural network 230 can also be recurrent neural networks (RNN).

Figure 3:
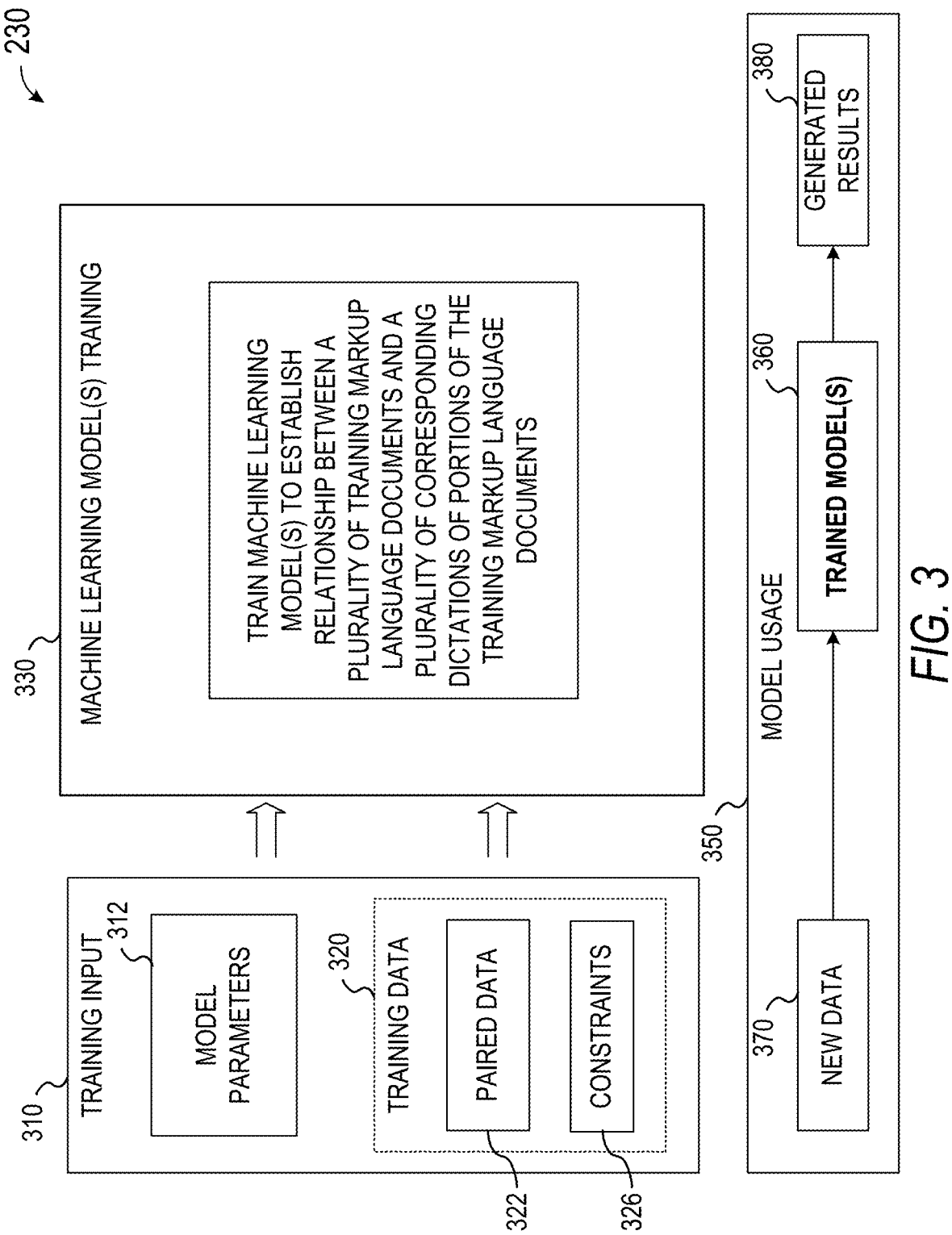
FIG. 3 is a block diagram of an example accessibility system that may be deployed within the system of FIG. 2, according to some embodiments.

FIG. 3 is a block diagram of an example accessibility system 230 that may be deployed within the system of FIG. 2, according to some embodiments. Training input 310 includes model parameters 312 and training data 320 which may include paired training data sets 322 (e.g., input-output training pairs) and constraints 326. Model parameters 312 stores or provides the parameters or coefficients of corresponding ones of machine learning models $\hat{A}_\theta$. During training, these parameters 312 are adapted based on the input-output training pairs of the training data sets 322. After the parameters 312 are adapted (after training), the parameters are used by trained treatment models 360 to implement the trained machine learning models $\hat{A}_\theta$ on a new set of data 370.

Training data 320 includes constraints 326 which may define the constraints of a given markup language document, such as a website or webpage. The paired training data sets 322 may include sets of input-output pairs, such as a pairs of a plurality of training markup language document (or portions of the markup language documents) and corresponding training dictations. Some components of training input 310 may be stored separately at a different off-site facility or facilities than other components.

Machine learning model(s) training 330 trains one or more machine learning techniques $\hat{A}_\theta$ based on the sets of input-output pairs of paired training data sets 322. For example, the model training 330 may train the ML model parameters 312 by minimizing a loss function based on one or more ground-truth dictations of markup language documents. Particularly, the ML model can be applied to a training markup language document to estimate a dictation of the markup language document. In some implementations, a derivative of a loss function is computed based on a comparison of the estimated dictation and the ground truth dictation and parameters of the ML model are updated based on the computed derivative of the loss function.

The result of minimizing the loss function for multiple sets of training data trains, adapts, or optimizes the model parameters 312 of the corresponding ML models. In this way, the ML model is trained to establish a relationship between a plurality of training markup language documents and a corresponding plurality of dictations.

The ML model is trained in one implementation according to supervised learning techniques to estimate dictations from training markup language documents. Supervised learning techniques assume that $x^*_f = \arg\min_x f(x)$ is known from previously determining dictations corresponding to markup language documents. In such cases, to train the ML model $\Lambda_\theta$, a plurality of training markup language documents are retrieved together with their corresponding training dictations. For example, the training markup language documents are retrieved from training markup language documents 41 stored in database 43 (FIG. 4). The ML model is applied to a first batch of training markup language documents to estimate a given set of dictations. The batch of the training markup language documents can be used to train the ML model with the same parameters of the ML model and may range from one training markup language document to all of the training markup language documents. In some implementations, the output or result of the ML model is used to compute a first dictation. Additionally, the dictations corresponding to the batch of markup language documents is used to compute a second dictation in a similar manner.

The first dictation and the second dictation are applied to a loss function and a gradient or derivative of the loss function with the applied doses is computed. Based on the gradient or derivative of the loss function, updated parameters for the ML model are computed. For example, parameters of the ML model are stored in trained machine learning technique 42 of database 43. The ML model is then applied with the updated parameters to a second batch of training markup language documents to again estimate a given set of dictations and apply the dictations to a loss function. Parameters of the ML model are again updated and iterations of this training process continue for a specified number of iterations or epochs or until a given convergence criteria has been met.

After the machine learning model $\hat{A}_\theta$ (sometimes referred to as $\Lambda_\theta$) is trained, new data 370, including one or more markup language documents, may be received. The trained machine learning technique $\hat{A}_\theta$ may be applied to the new data 370 to generate generated results 380 including dictations of the markup language documents.

In one embodiment, the markup language neural network 230 processes the raw markup language document portions at an input layer, an embed layer, an LSTM layer, an attention layer and an output layer. The input layer receives the raw markup language document as well as the generated or estimated markup language document that represents a dictation of the raw markup language document and separates the raw markup language document into separate words. Each word is passed to the embed layer for processing. The LSTM layer further processes the values received from the embed layer and generate values that are provided to the attention layer and the output layer. The output layer is the final layer that processes and outputs an estimated markup language document that includes the dictation of the raw markup language document received at the input.

Figure 5:
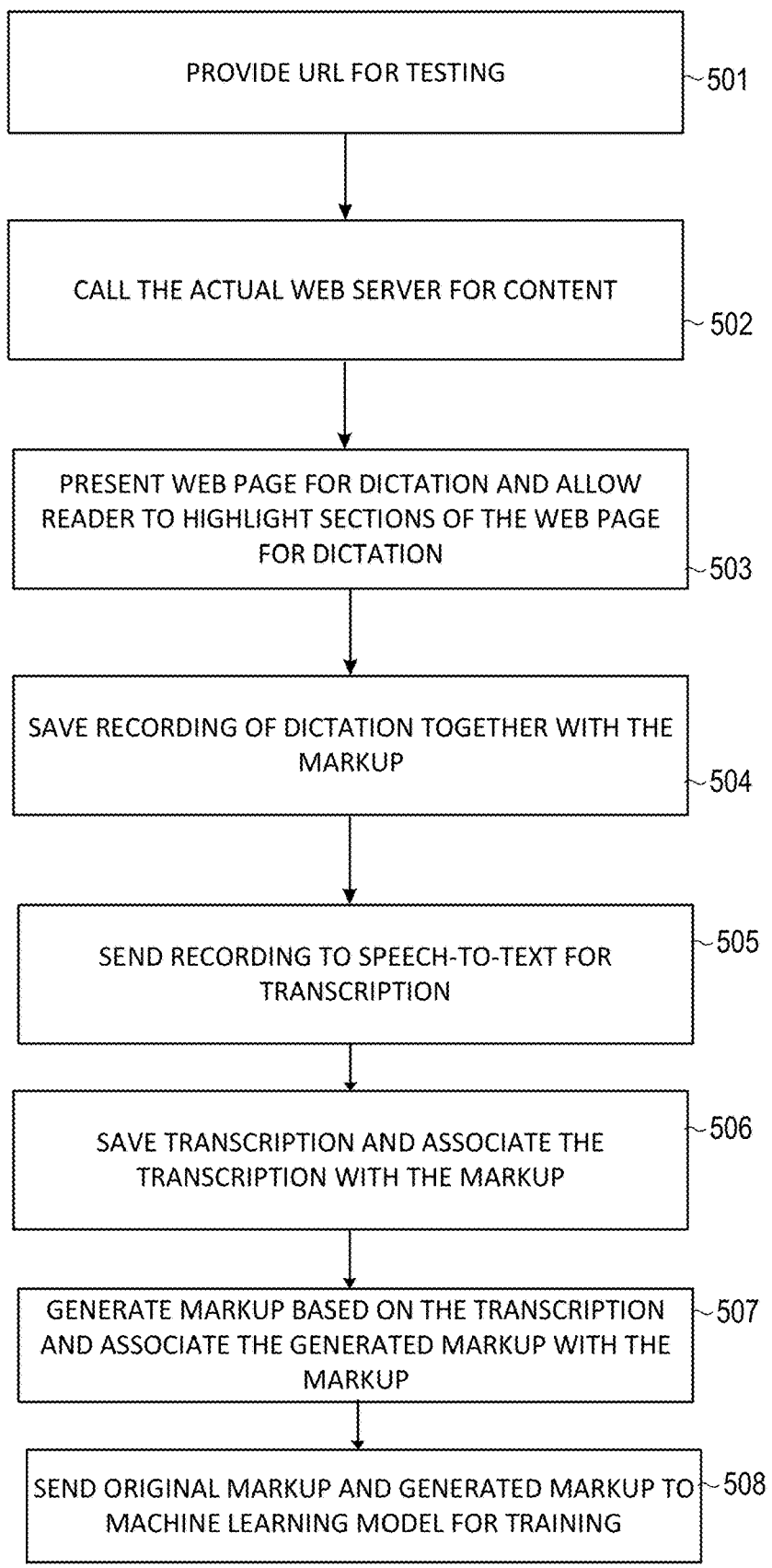
FIGS. 5, 6 and 7 are flowcharts illustrating example operations of the accessibility system, according to example embodiments.
Figure 6:
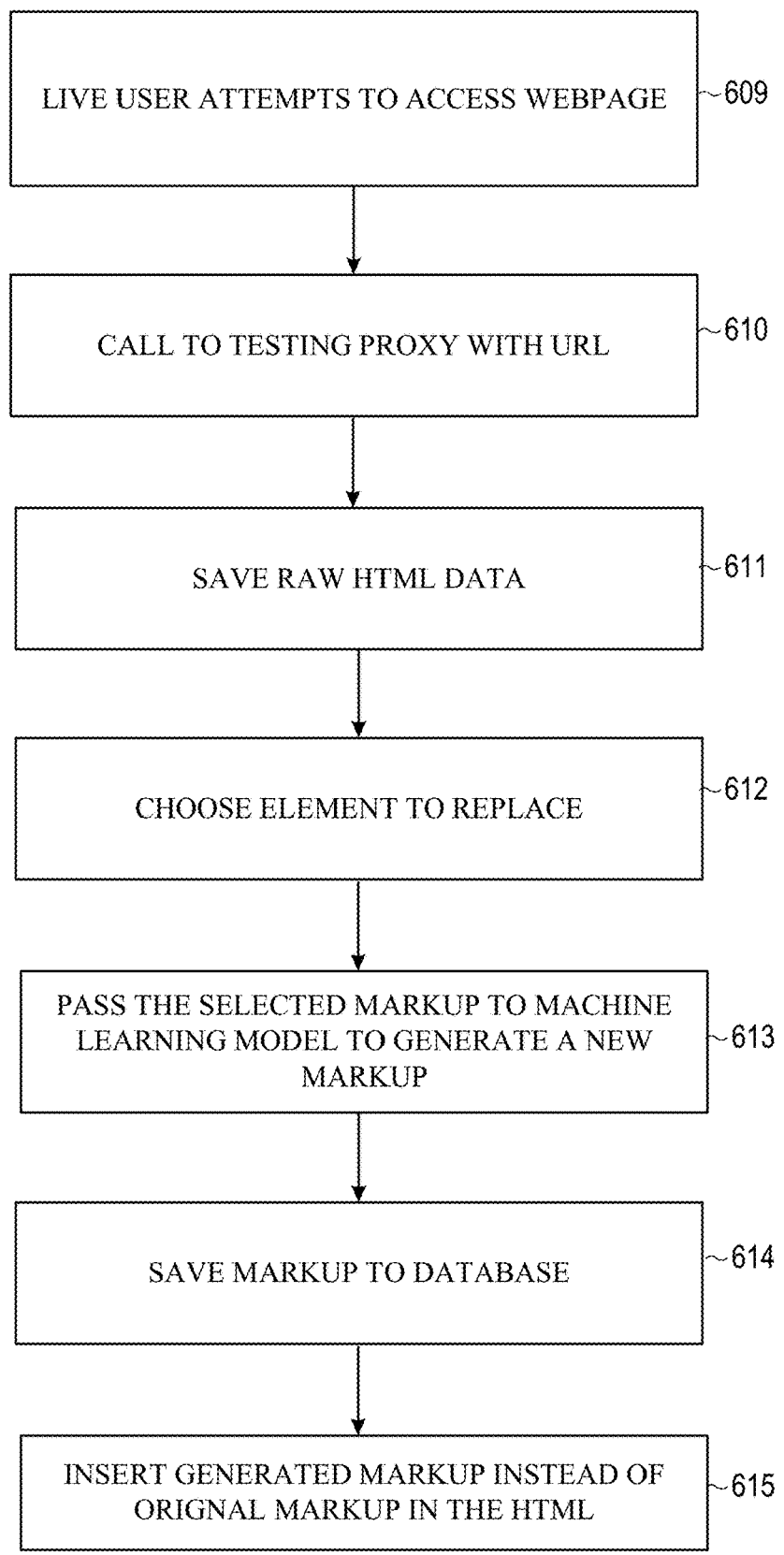
Figure 6:
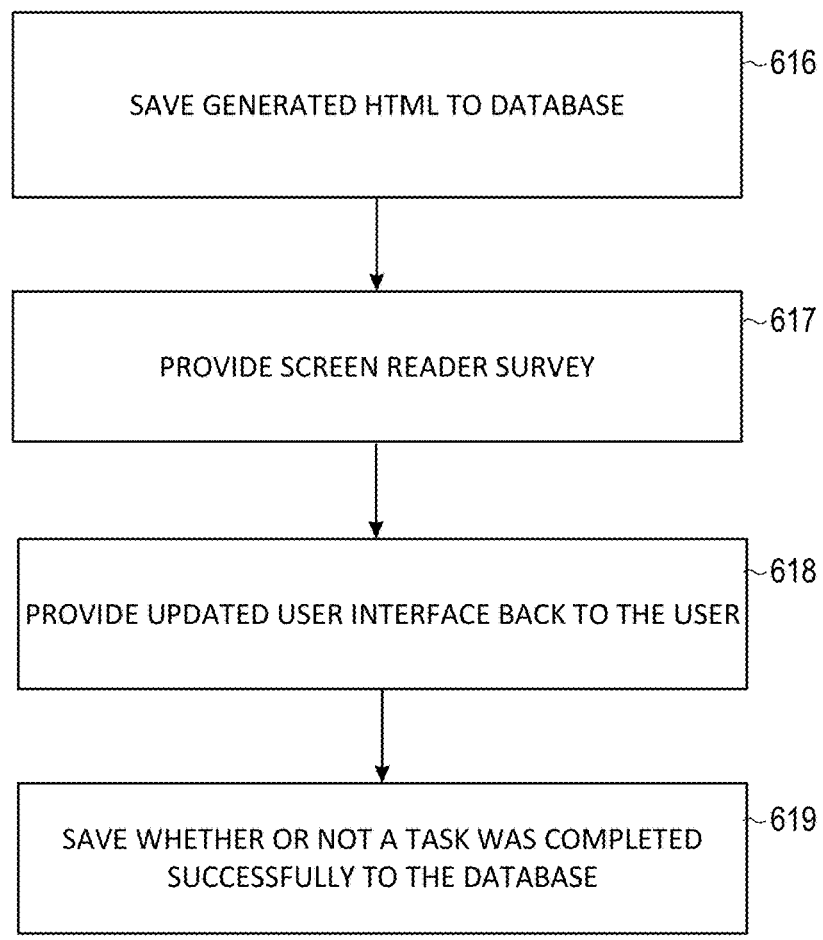
Figure 7:
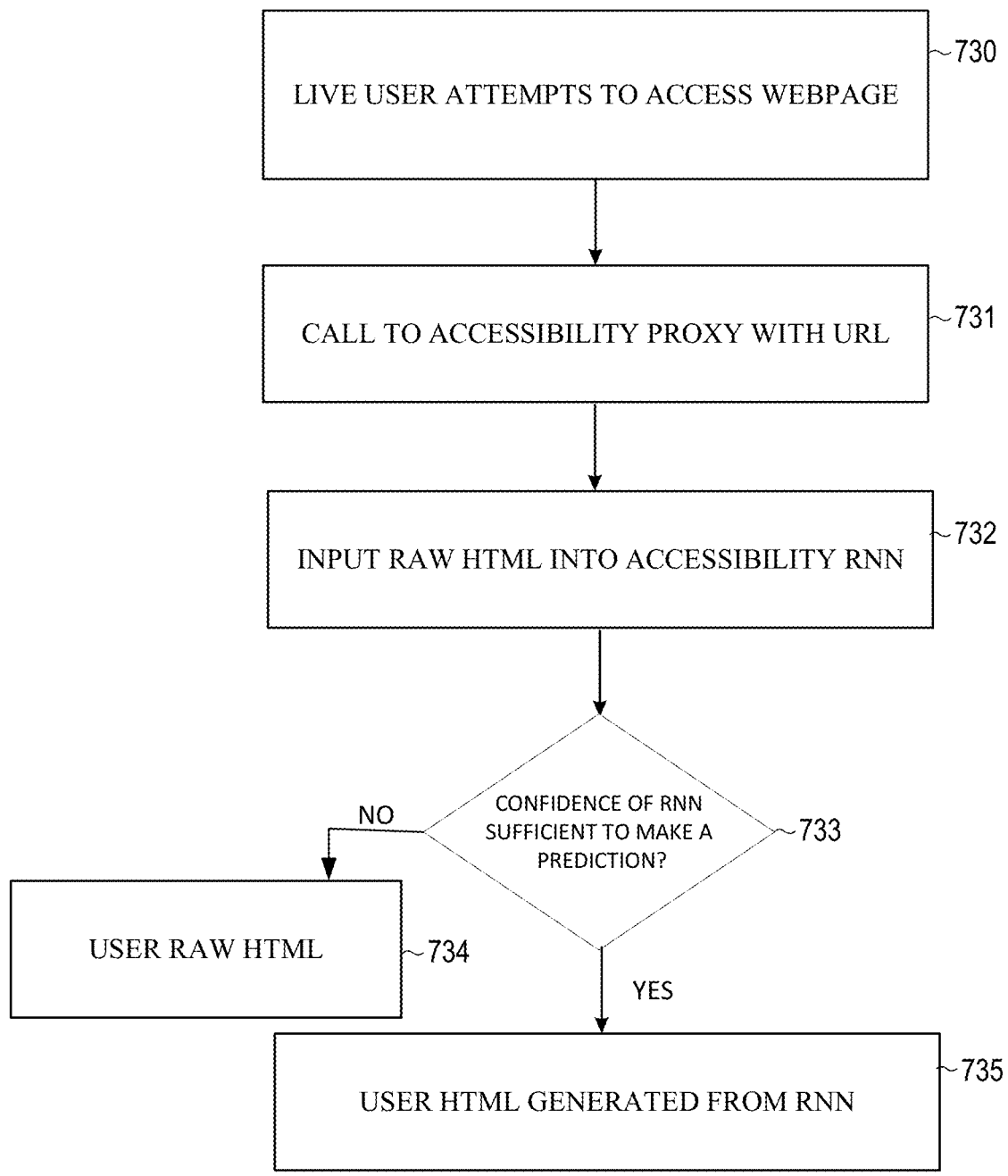

FIGS. 5, 6 and 7 are flowcharts illustrating example operations of the accessibility system, according to example embodiments. Specifically, the operations shown in FIG. 5 are performed to generate the training markup language documents 41 and corresponding dictations.

At operation 501, a URL is provided for testing a markup language document. For example, a user at the agent client device 11 inputs a web address that includes the URL into a web browser application. The web browser application of the agent client device 11 connects to the accessibility system 10 to obtain the web page corresponding to the URL.

At operation 502, the actual web server is accessed using the URL to retrieve the markup language document. For example, the accessibility system 10 includes a web server that stores various markup language documents used for testing and training the machine learning model. Specifically, a raw HTML file (markup language document) used for testing is stored and provided to the agent client device 11.

Figure 8:
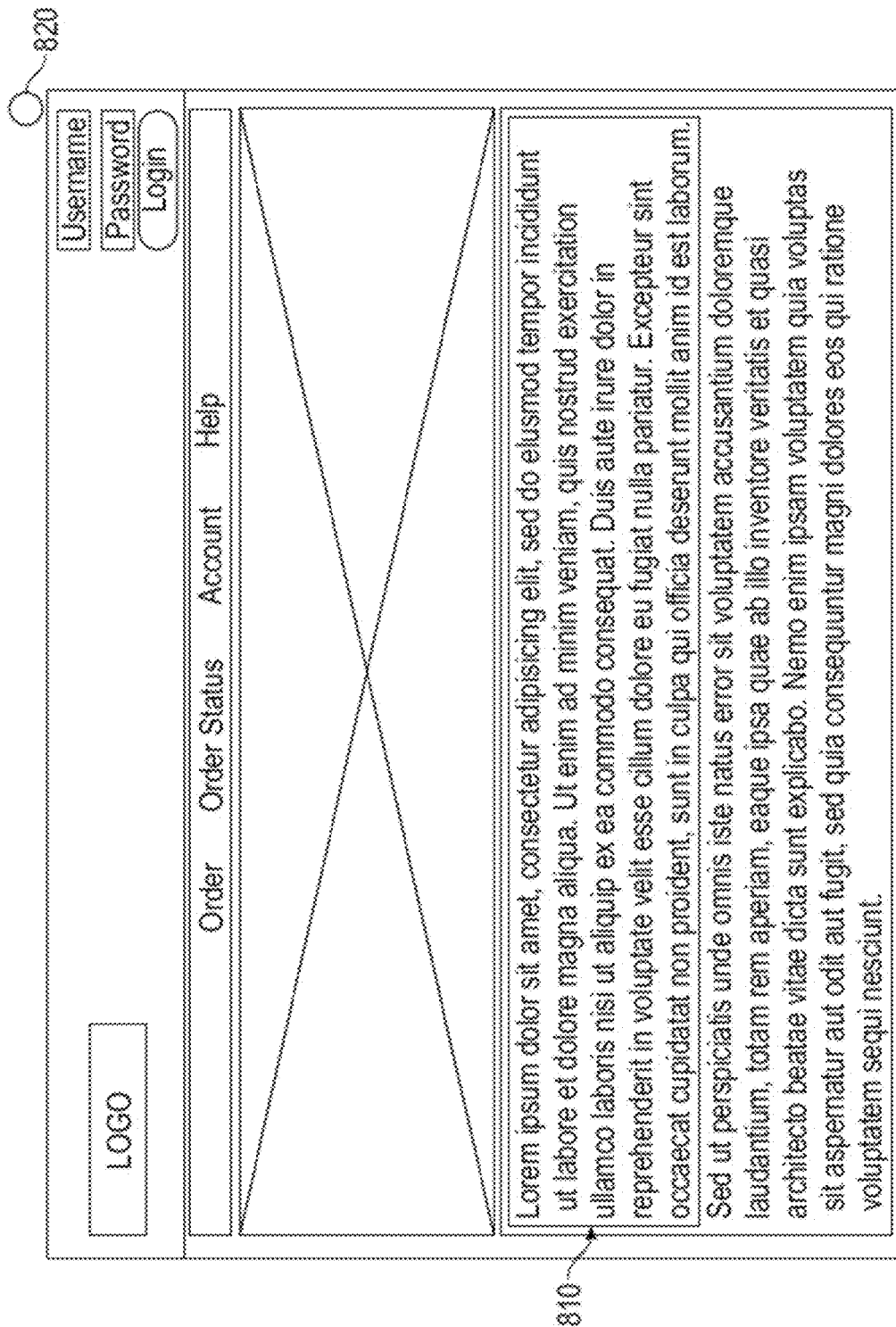
FIG. 8 is an example website used to provide training data to the accessibility system, according to example embodiments.

At operation 503, the web page is presented for dictation to a user on an agent client device 11 to allow the reader (user on the agent client device 11) to highlight sections of the web page for dictation. For example, the web browser on the agent client device 11 presents a web page, such as the web page shown in FIG. 8.

At operation 504, a recording of the dictation is saved together with the markup language document. For example, the user at the agent client device 11 selects the record button 820 and then highlights a section 810 of the web page that is presented. Alternatively, the user highlights the section 810 and then selects the record button 820. In response to the selection of the record button 820, the user begins speaking or verbalizing a dictation representing the highlighted section 810. This dictation is stored as a wave file or MP3 file and is associated with the raw HTML file that is stored on the accessibility system 10 (particularly on database 43).

At operation 505, the recording is sent to a speech-to-text engine for transcription. For example, the accessibility system 10 transmits the wave file or MP3 file to the offline analysis server 17 (e.g., a speech-to-text engine or processor) to convert the verbalized dictation (the spoken words) to a textual representation in a text file.

At operation 506, the transcription is saved and associated with the markup language document portion that has been highlighted. For example, the accessibility system 10 receives the text file corresponding to the verbalized dictation from the offline analysis server 17 and stores the text file in association with the raw markup language document on the database 43. Particularly, the accessibility system 10 stores the text file in specific association with the segment of the markup language document corresponding to the highlighted section 810. In some cases, the accessibility system 10 extracts the markup language portion corresponding to the highlighted section 810 and separately stores the extracted markup language portion together with the received text file that includes the text corresponding to the dictation of the highlighted section 810.

At operation 507, markup language is generated based on the transcription and is associated with the markup language document portion that has been highlighted. For example, the accessibility system 10 transmits the text file corresponding to the dictation of the highlighted section 810 to the markup language conversion processor 18. The markup language conversion processor generates markup language (e.g., an aria label) that includes the text in the text file to cause a web browser to employ a text-to-speech engine to read out the text in the text file. This aria label causes the dictation to be audibly presented to the user, such as a user at a member-related client device 12 when the user accesses a markup language document that includes markup language that is similar to or identical to the extracted portion of the markup language document.

At operation 508, the original markup language document (e.g., the markup language document portion that has been highlighted) and the generated markup language are sent to a machine learning model for training. For example, the machine learning model that operates using model parameters 312 processes the extracted portion of the markup language document corresponding to the section 810 and estimates a textual dictation for the markup language document portion. The estimated textual dictation is compared with the actual ground-truth dictation that is retrieved from the text file. A deviation is computed based on a loss function as a result of the comparison and the model parameters 312 are updated. In some cases, the machine learning model operates using model parameters 312 to process the extracted portion of the markup language document corresponding to the section 810 and estimates a markup language document portion (e.g., an aria label) that represents the textual dictation for the markup language document portion. The estimated markup language document portion is compared with the actual ground-truth markup language document portion generated at operation 407. A deviation is computed based on a loss function as a result of the comparison and the model parameters 312 are updated.

By training the machine learning model to generate a new markup language document portion that represents a dictation for a given training raw markup language document portion, the machine learning model can provide the corresponding markup language document portion that represents a dictation for a new raw markup language document portion. Specifically, the machine learning model can be trained to generate markup language dictations for a first portion of a first website (e.g., a training website), such as an ordered list of items on the first website. When applied to a new website that also includes an ordered list of items among other content different from the training website, the machine learning model can generate the markup language (e.g., the aria label) with the dictation for the ordered list of items even though the new website has never been processed by the machine learning model and even though a human dictation has not been previously generated for the new website. In this way, visually impaired websites can quickly and easily be provided to users who have visual impairments with minimal expense.

The operations shown in FIG. 6 are performed for providing a user at a member-related client device 12 with a markup language document that has been fully or partially converted to a visually accessible markup language document using a trained machine learning technique. At operation 609, a live user attempts to access a webpage.

At operation 610, the testing proxy is called or accessed using the URL of the webpage. For example, a user at the agent client device 11 inputs a web address that includes the URL into a web browser application. The web browser application of the agent client device 11 connects to the accessibility system 10 to obtain the web page corresponding to the URL.

At operation 611, the raw markup language document of the webpage (e.g., the HTML) is saved. For example, the accessibility system 10 includes a web server that stores various markup language documents used for testing and training the machine learning model.

At operation 612, an element of the webpage is selected to be replaced. For example, the web browser on the agent client device 11 presents a web page, such as the web page shown in FIG. 8 and the user at the agent client device 11 selects the record button 820 and then highlights a section 810 of the web page that is presented. The section 810 may correspond to an ordered list of items that the user would like to replace with a dictation.

At operation 613, the selected markup language corresponding to the selected element of the markup language document is provided to a machine learning model to generate new markup language for the selected element. For example, the markup language portion below corresponds to the extracted portion of a full markup language document and represents the markup language for the section 810 that is selected to be replaced.

Example Chosen Element
<ol>
  <li>uno<li>
  <li>dos<li>

```
<li>tres<li>
<ol>
```
This markup language portion above is provided to a machine learning model that operates using model parameters 312, such as trained model 360. The trained model 360 generates new markup language that includes an estimated dictation (e.g., using an aria label) for the selected markup language. New markup language below is an example of the new markup language generated by the trained model 360 based on the markup language portion above that corresponds to the extracted portion of the full markup language document.

Example Generated Markup
```
<div aria-label="There is a list of three items uno, dos,
    and tres">
    <ol aria-hidden="true">
        <li>uno</li>
        <li>dos</li>
        <li>tres</li>
    <ol>
</div>
```
As shown above, the new markup language includes an aria label for reading out a dictation for the extracted portion and the extracted portion is associated with hidden labels to prevent the extracted portion from being presented on a display.

At operation 614, the new markup language is saved to a database. For example, the new markup language is stored in the database 43.

At operation 615, the new markup language is inserted in place of the selected markup language corresponding to the selected element of the markup language document in the markup language document. As an example, the selected markup language document is hidden and the new markup language is inserted with an aria label in the markup language document.

At operation 616, the generated or revised markup language document is saved. For example, the generated or revised markup language document is stored in the database 43.

At operation 617, a screen reader survey is provided. For example, member-related client device 12 requests access to a webpage at the URL provided in operation 610. In response, the customer service server system 2 applies a Montel Carlo simulation to decide whether to provide to the user: 1) the generated or revised markup language document that is stored in the database 43 in which a portion of the markup language document has been replaced with a machine learning model based dictation or 2) a text-to-speech version of the webpage in which at least the same portion is simply run through a typical text-to-speech engine.

At operation 618, an updated user interface is provided back to the user. The user at the member-related client device 12 receives the randomly selected markup language document (e.g., the document with the machine learning model based revision or the document to which a typical text-to-speech engine has been applied).

At operation 619, an indication is saved as to whether or not a task was successfully completed in the updated user interface. The screen reader survey uses accessibility system 10 to determine whether tasks were completely or partially completed on the webpage by the user of the member-related client device 12. The screen reader survey collects results from a plurality of users indicating the task completion probability for the markup language documents with the machine learning model based dictation and indicating the task completion probability for the markup language documents with the typical text-to-speech engine applied.

In some embodiments, the accessibility system 10 applies a weight to each task of a given webpage and a weight to each survey and accumulates the weights together. The weights in total should equal '1'. More complex tasks may be associated with greater value weights than less complex tasks. As tasks get completed the tasks are combined with their corresponding weights to store an aggregated score for the task completion of the given webpage. In some cases, the survey scores are normalized across multiple webpages. An overall score is computed as a function of the weight per task multiplied by whether the task was successfully completed and added with the weight of the survey and the normalized score of the survey (e.g., $success_{total}=(weight_{task}*success_{task})+(weight_{survey}*normalizedscoresurvey))$. In some cases, data for which the score is below a level of task completion and customer satisfaction are filtered out of the data used to train the machine learning model.

The operations shown in FIG. 7 are performed for providing a user at a member-related client device 12 with a markup language document that has been fully or partially converted to a visually accessible markup language document using a trained machine learning technique. At operation 730, a live user attempts to access a webpage.

At operation 731, the accessibility proxy is called or accessed using the URL of the webpage. For example, a user at a member-related client device 12 accesses a new webpage, such as the webpage shown in FIG. 9. In some cases, the user selects an option on the web browser to enable a visually accessibility setting. In response, when the member-related client device 12 requests the webpage, the member-related client device 12 indicates to the server that a visually accessible version of the webpage is being requested.

Figure 9:
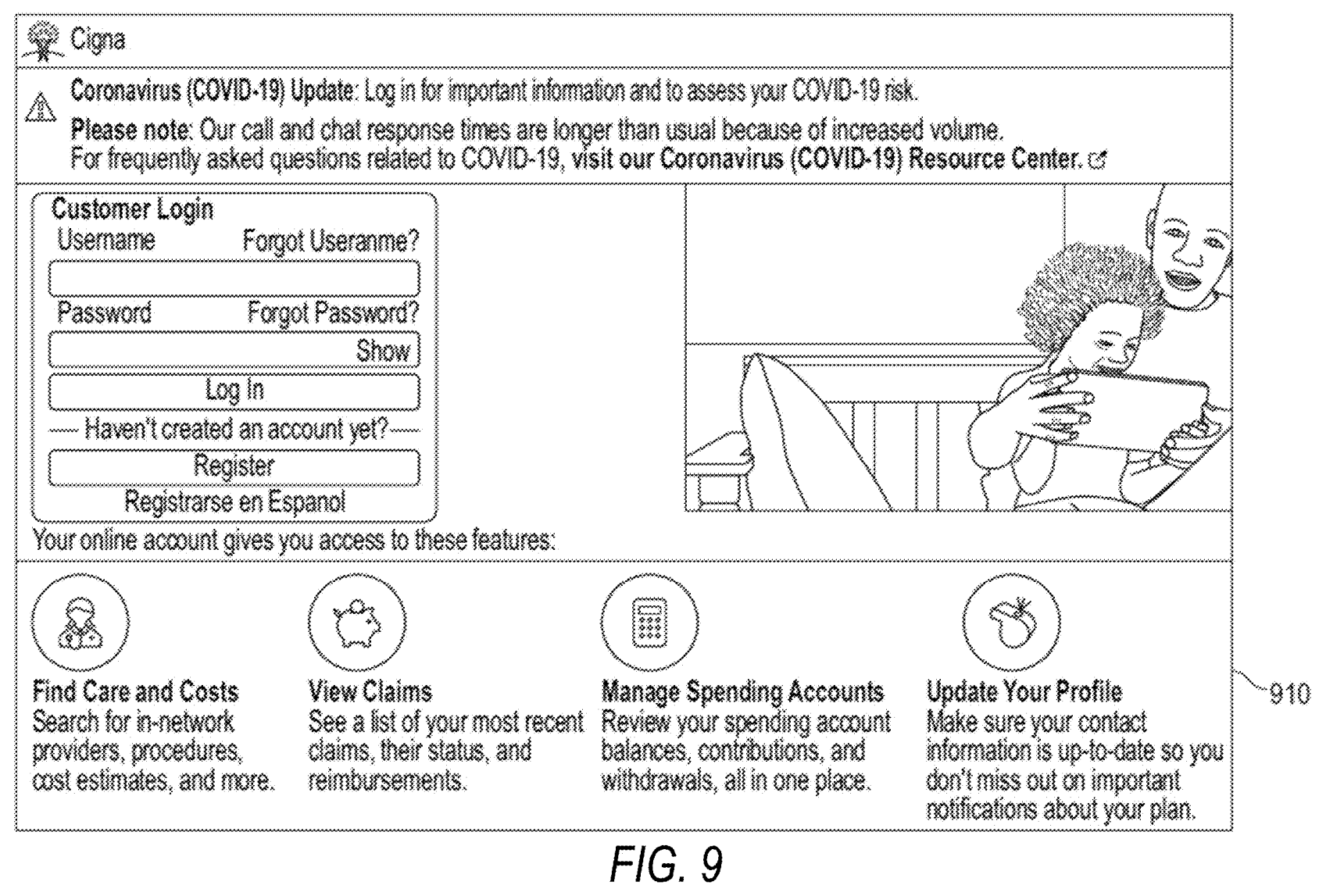

At operation 732, the raw markup language document of the webpage (e.g., the HTML) is provided to a trained machine learning model (e.g., an RNN). For example, the markup language document corresponding to the webpage shown in FIG. 9 is provided to the accessibility system 10 (particularly to the trained model 360) in response to receiving the request for the visual accessibility version of the webpage. The trained model 360 processes sections of the markup language document to estimate new markup language for one or more portions. For example, the trained model 360 may have been previously trained to generate markup language (e.g., an aria label with a dictation) for an ordered list of items. The new markup language document corresponding to the webpage shown in FIG. 9 may include an ordered list of items 910. In this case, the trained model 360 generates a new markup language that estimates a dictation for the ordered list of items 910.

At operation 733, a determination is made as to whether a confidence of the machine learning model is sufficient to make a prediction. If so, the process proceeds to operation 735. If not, the process proceeds to operation 734. For example, the trained model 360 may compute a score with a confidence in the estimated dictation for the ordered list of items 910. The trained model 360 computes another score for an estimated dictation of a second portion of the webpage shown in in FIG. 9. In some circumstances, if the score if greater than a given threshold, the new markup language document replaces the raw markup language document to provide a dictation for the portion with the score that is greater than the threshold. If the score is less than the given threshold but greater than a second threshold, a typical text-to-speech engine is used to transcribe the markup language document instead of using the estimated dictation of the trained model 360. If the score is less than the second threshold, the raw markup language document is not modified.

At operation 735, the user is presented with a markup language document generated from the machine learning model.

At operation 734, the user is presented with the raw markup language document.

Figure 10:
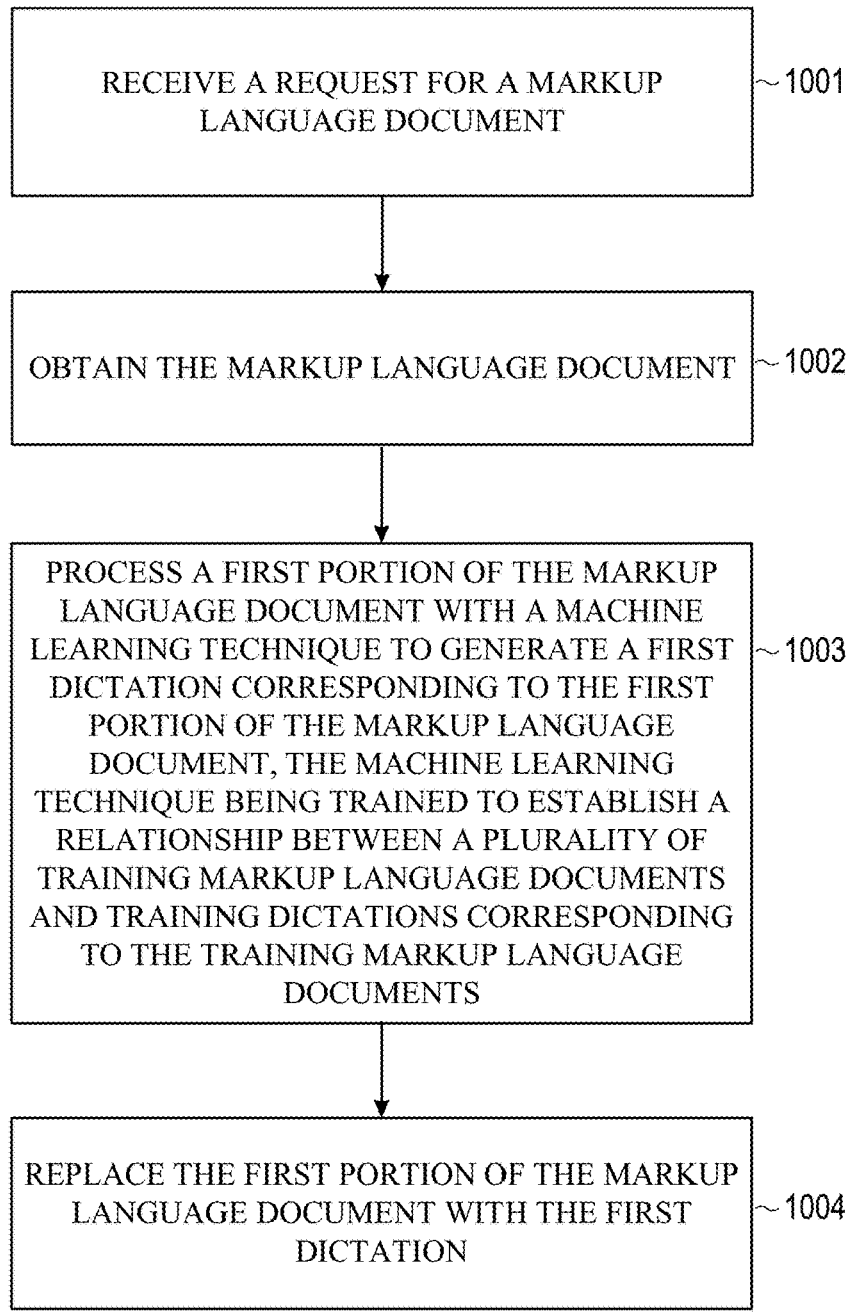
FIG. 10 is a flowchart illustrating example operations of the accessibility system, according to example embodiments.

FIG. 10 is a flowchart illustrating example operations of the visually accessible website system in performing process 1000, according to example embodiments. The process 1000 may be embodied in computer-readable instructions for execution by one or more processors such that the operations of the process 1000 may be performed in part or in whole by the functional components of the system 1; accordingly, the process 1000 is described below by way of example with reference thereto. However, in other embodiments, at least some of the operations of the process 1000 may be deployed on various other hardware configurations. Some or all of the operations of process 1000 can be in parallel, out of order, or entirely omitted.

At operation 1001, the system 1 receives a request for a markup language document.

At operation 1002, the system 1 obtains the markup language document.

At operation 1003, the system 1 processes a first portion of the markup language document with a machine learning technique to generate a first dictation corresponding to the first portion of the markup language document. The machine learning technique is trained to establish a relationship between a plurality of training markup language documents and training dictations corresponding to the training markup language documents.

At operation 1004, the system 1 replaces the first portion of the markup language document with the first dictation.

Figure 11:
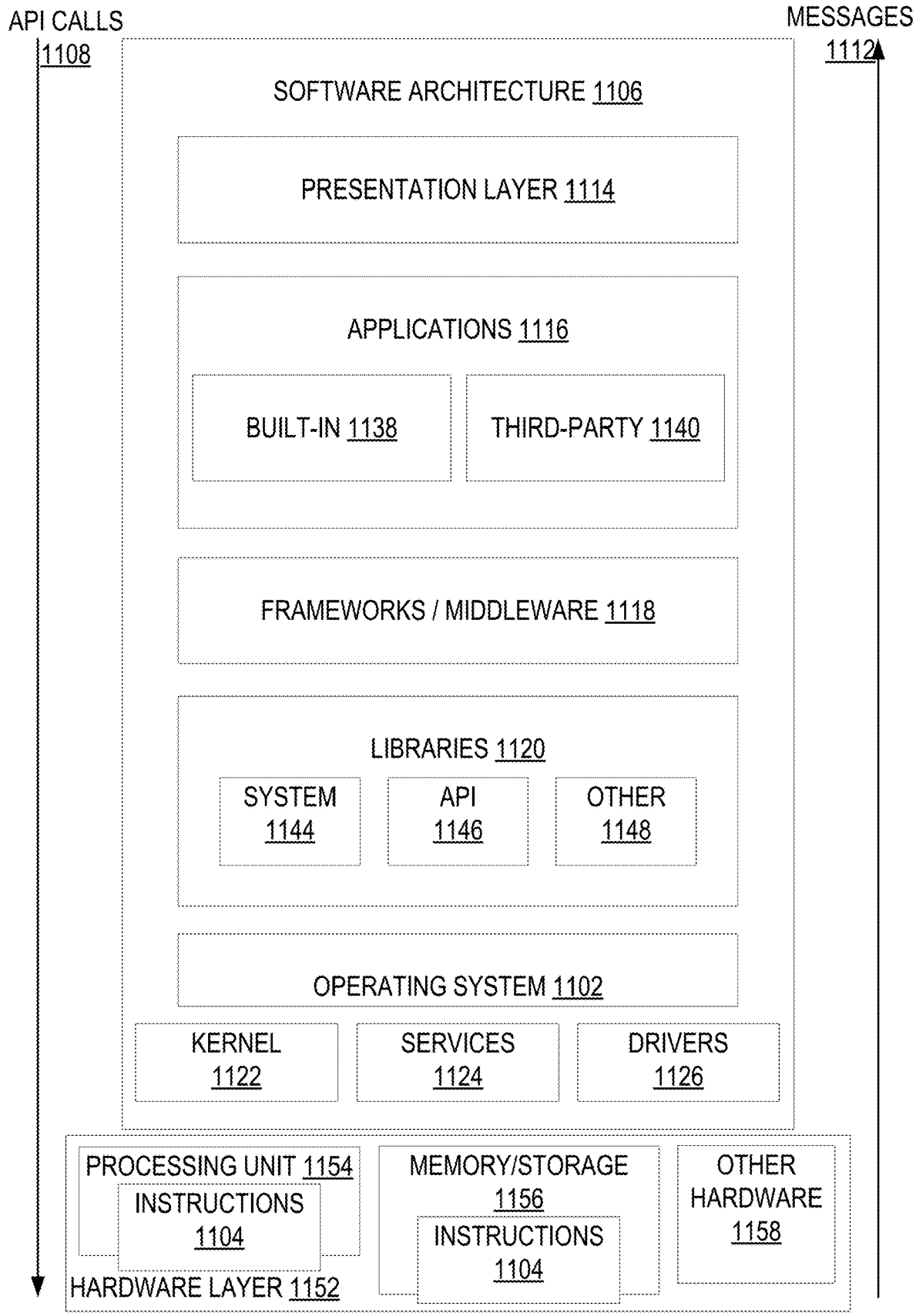
FIG. 11 is a block diagram illustrating an example software architecture, which may be used in conjunction with various hardware architectures herein described.

FIG. 11 is a block diagram illustrating an example software architecture 1106, which may be used in conjunction with various hardware architectures herein described. FIG. 11 is a non-limiting example of a software architecture and it will be appreciated that many other architectures may be implemented to facilitate the functionality described herein. The software architecture 1106 may execute on hardware such as machine 1200 of FIG. 12 that includes, among other things, processors 1204, memory 1214, and input/output (I/O) components 1218. A representative hardware layer 1152 is illustrated and can represent, for example, the machine 1200 of FIG. 12. The representative hardware layer 1152 includes a processing unit 1154 having associated executable instructions 1104. Executable instructions 1104 represent the executable instructions of the software architecture 1106, including implementation of the methods, components, and so forth described herein. The hardware layer 1152 also includes memory and/or storage devices memory/storage 1156, which also have executable instructions 1104. The hardware layer 1152 may also comprise other hardware 1158. The software architecture 1106 may be deployed in any one or more of the components shown in FIG. 1 or 2 (e.g., agent client device 11, member-related client device 12, system 2, offline analysis server 17, or markup language conversion processor 18). The software architecture 1106 can be utilized to apply a machine learning technique or model to estimate new markup language that includes a dictation for at least one or more portions of a raw markup language document. The software architecture 1106 can selectively replace one or more portions of a requested raw markup language document with the estimated new markup language based on a confidence score associated with the generated estimate.

In the example architecture of FIG. 11, the software architecture 1106 may be conceptualized as a stack of layers where each layer provides particular functionality. For example, the software architecture 1106 may include layers such as an operating system 1102, libraries 1120, frameworks/middleware 1118, applications 1116, and a presentation layer 1114. Operationally, the applications 1116 and/or other components within the layers may invoke API calls 1108 through the software stack and receive messages 1112 in response to the API calls 1108. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1102 may manage hardware resources and provide common services. The operating system 1102 may include, for example, a kernel 1122, services 1124, and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than to interface directly with the underlying operating system 1102 functionality (e.g., kernel 1122, services 1124 and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/devices.

The frameworks/middleware 1118 (also sometimes referred to as middleware) provide a higher-level common infrastructure that may be used by the applications 1116 and/or other software components/devices. For example, the frameworks/middleware 1118 may provide various graphic user interface functions, high-level resource management, high-level location services, and so forth. The frameworks/middleware 1118 may provide a broad spectrum of other APIs that may be utilized by the applications 1116 and/or other software components/devices, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. Third-party applications 1140 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1140 may invoke the API calls 1108 provided by the mobile operating system (such as operating system 1102) to facilitate functionality described herein.

The applications 1116 may use built-in operating system functions (e.g., kernel 1122, services 1124, and/or drivers 1126), libraries 1120, and frameworks/middleware 1118 to create UIs to interact with users of the system. Alternatively, or additionally, in some systems, interactions with a user may occur through a presentation layer, such as presentation layer 1114. In these systems, the application/component "logic" can be separated from the aspects of the application/component that interact with a user.

Figure 12:
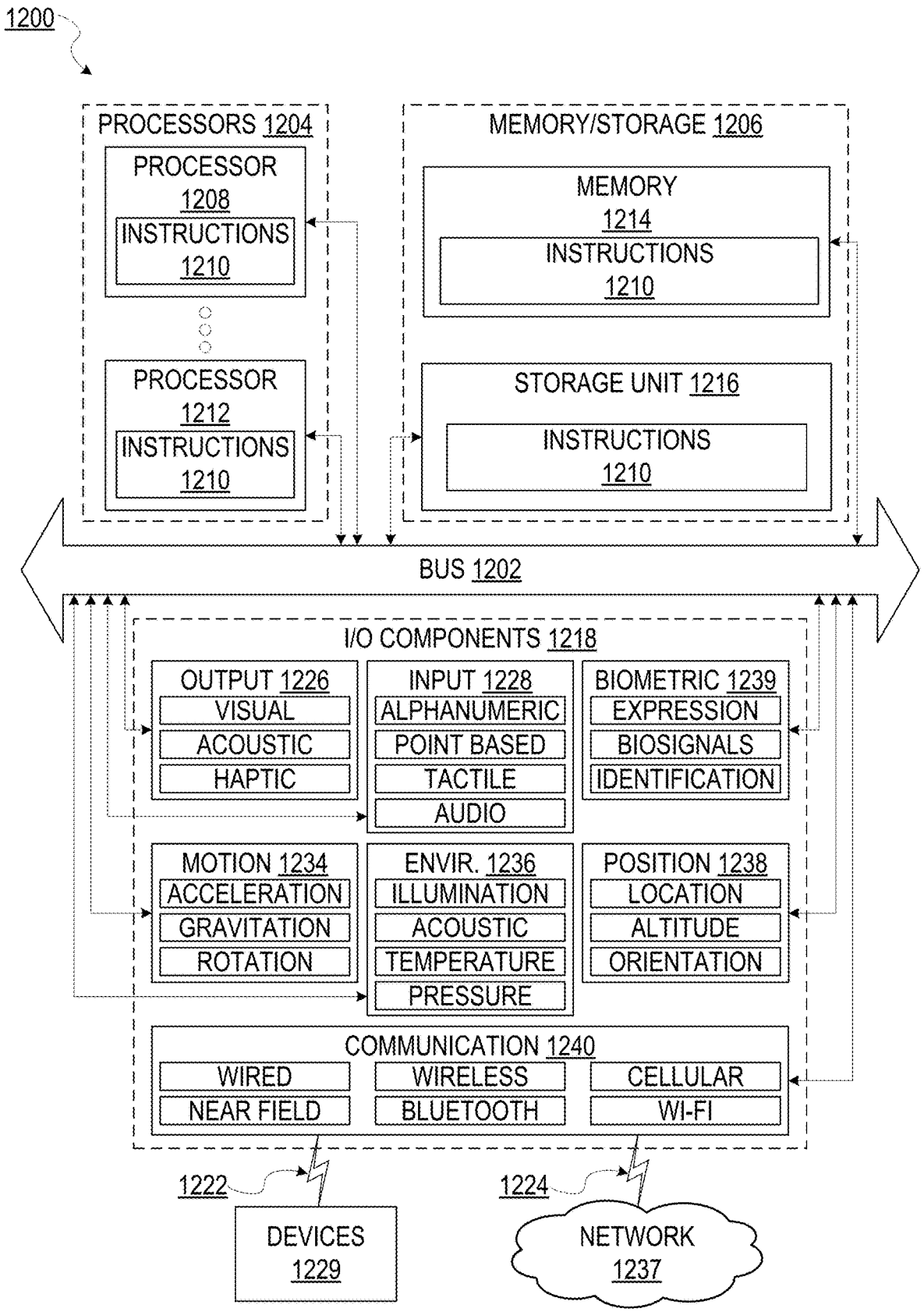
FIG. 12 is a block diagram illustrating components of a machine, according to some example embodiments.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. For example, the instructions 1210 may be executed by the accessibility system 10 to process a raw markup language document portion with a trained machine learning model to generate new markup language (e.g., an aria label with a dictation) for the raw markup language document portion.

As such, the instructions 1210 may be used to implement devices or components described herein. The instructions 1210 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, electronic delivery detection 140, perishable item delivery server 105, smart home service provider server 107, device 132a, device 133a, device 134a, device 132b, device 133b, device 134b, a server computer, a client computer, a personal computer (PC), a tablet computer, a laptop computer, a netbook, a STB, a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory/storage 1206, and I/O components 1218, which may be configured to communicate with each other such as via a bus 1202. In an example embodiment, the processors 1204 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1208 and a processor 1212 that may execute the instructions 1210. The term "processor" is intended to include multi-core processors 1204 that may comprise two or more independent processors (sometimes referred to as "cores") that may execute instructions contemporaneously. Although FIG. 12 shows multiple processors 1204, the machine 1200 may include a single processor with a single core, a single processor with multiple cores (e.g., a multi-core processor), multiple processors with a single core, multiple processors with multiple cores, or any combination thereof.

The memory/storage 1206 may include a memory 1214, such as a main memory, or other memory storage, database 110, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of processors 1204 are examples of machine-readable media.

The I/O components 1218 may include a wide variety of components to receive input, provide output, produce output, transmit information, exchange information, capture measurements, and so on, such as devices 132a-b, 133a-b, and 134a-b. The specific I/O components 1218 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various example embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1218 may include biometric components 1239, motion components 1234, environmental components 1236, or position components 1238 among a wide array of other components. For example, the biometric components 1239 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1234 may include acceleration sensor components (e.g., accelerometer), gravitation sensor components, rotation sensor components (e.g., gyroscope), and so forth. The environmental components 1236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1237 or devices 1229 via coupling 1224 and coupling 1222, respectively. For example, the communication components 1240 may include a network interface component or other suitable device to interface with the network 1237. In further examples, communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1229 may be another machine or any of a wide variety of peripheral devices (e.g., a peripheral device coupled via a USB).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as location via Internet Protocol (IP) geo-location, location via Wi-Fi® signal triangulation, location via detecting a NFC beacon signal that may indicate a particular location, and so forth.

The present disclosure at times uses a two hour time window for purposes of illustration, e.g., 1-3 PM, 3-5 PM, etc. The present disclosure encompasses time windows of different lengths, e.g., one hour greater than two hours, four hours, or eight hours. The location-based model can adjust the length of a delivery time window based on the sensed data that a person is present at the location. These delivery time periods can be dynamic, e.g., a base window is two hours that can be started earlier or later depending on the likelihood that a person is present at the location.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a LAN, a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC, or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. A method comprising:
    receiving, by one or more processors, a request for a markup language document;
    obtaining, by the one or more processors, the markup language document;
    processing a first portion of the markup language document with a machine learning technique to generate a first dictation corresponding to the first portion of the markup language document, the machine learning technique being trained to establish a relationship between a plurality of training markup language documents and training dictations corresponding to the training markup language documents, the machine learning technique being trained by:
        obtaining a first batch of training data comprising a first set of the plurality of training markup language documents and a first set of the corresponding training dictations;
        processing the first set of training markup language documents with the machine learning technique to generate estimated dictations for the training markup language documents;
        computing a loss function based on a deviation between the estimated dictations for the training markup language documents and the corresponding training dictations; and
        updating parameters of the machine learning technique based on the computed loss function; and
    replacing the first portion of the markup language document with the first dictation.

2. The method of claim 1, wherein the markup language document comprises a webpage that is requested by a web browser application implemented on a client device.

3. The method of claim 1, wherein replacing the first portion comprises replacing the first portion of the markup language document with markup language corresponding to the first dictation.

4. The method of claim 1, further comprising:
    transcribing a second portion of the markup language document to modify the markup language document to include the first dictation generated using the machine learning technique and the transcribed second portion of the markup language document.

5. The method of claim 1, wherein the machine learning technique comprises a neural network.

6. The method of claim 5, wherein the neural network comprises at least one of a recurrent neural network or a bi-directional long short-term memory (LTSM) neural network.

7. The method of claim 1, wherein replacing the first portion comprises:
    modifying the first portion to hide content in the first portion from being displayed; and
    adding markup language corresponding to the first dictation.

8. The method of claim 1, further comprising generating a first of the dictations corresponding to a first of the plurality of training markup language documents by:
    displaying a training webpage based on the first training markup language document;
    receiving input selecting a portion of the displayed training webpage;
    identifying a portion of the first training markup language document corresponding to the selected portion;
    recording speech that reads out the selected portion of the displayed training webpage;
    transcribing the recorded speech to generate the first dictation corresponding to the first training markup language document; and
    associating the first dictation with the identified portion of the first training markup language document.

9. The method of claim 1, further comprising:
    computing a confidence score for the machine learning technique to generate a first dictation corresponding to the first portion of the markup language document;
    comparing the confidence score to a threshold; and
    replacing the first portion of the markup language document with the first dictation in response to determining that the confidence score exceeds the threshold.

10. The method of claim 9, further comprising:
    computing a second confidence score for the machine learning technique to generate a second dictation corresponding to a second portion of the markup language document;
    comparing the second confidence score to the threshold; and
    preventing replacing the second portion with the second dictation in response to determining that the second confidence score fails to exceed the threshold.

11. A method comprising:
receiving, by one or more processors, a request for a markup language document
obtaining, by the one or more processors, the markup language document; processing a first portion of the markup language document with a machine learning technique to generate a first dictation corresponding to the first portion of the markup language document, the machine learning technique being trained to establish a relationship between a plurality of training markup language documents and training dictations corresponding to the training markup language documents;
replacing the first portion of the markup language document with the first dictation, wherein replacing the first portion of the markup language document with the first dictation generates a first version of the markup language document, and further comprising:
transcribing the first portion of the markup language document to generate a second version of the markup language document;
applying a Monte Carlo simulation to randomly present the first version of the markup language document to a first group of users and randomly presenting the second version of the markup language document to a second group of users; and
generating a survey indicating task completion of the first group of users and the second group of users.

12. The method of claim 11, further comprising selecting a dictation for the first portion of the markup language document from the first and second versions of the markup language document based on the survey.

13. A system comprising:
one or more processors coupled to a memory comprising non-transitory computer instructions that when executed by the one or more processors perform operations comprising:
receiving a request for a markup language document;
obtaining the markup language document;
processing a first portion of the markup language document with a machine learning technique to generate a first dictation corresponding to the first portion of the markup language document, the machine learning technique being trained to establish a relationship between a plurality of training markup language documents and training dictations corresponding to the training markup language documents, the machine learning technique being trained by:
obtaining a first batch of training data comprising a first set of the plurality of training markup language documents and a first set of the corresponding training dictations;
processing the first set of training markup language documents with the machine learning technique to generate estimated dictations for the training markup language documents;
computing a loss function based on a deviation between the estimated dictations for the training markup language documents and the corresponding training dictations; and
updating parameters of the machine learning technique based on the computed loss function; and
replacing the first portion of the markup language document with the first dictation.

14. The system of claim 13, wherein the markup language document comprises a webpage that is requested by a web browser application implemented on a client device.

15. The system of claim 13, wherein replacing the first portion comprises replacing the first portion of the markup language document with markup language corresponding to the first dictation.

16. The system of claim 13, further comprising operations for:
transcribing a second portion of the markup language document to modify the markup language document to include the first dictation generated using the machine learning technique and the transcribed second portion of the markup language document.

17. A non-transitory computer readable medium comprising non-transitory computer-readable instructions for performing operations comprising:
receiving a request for a markup language document;
obtaining the markup language document;
processing a first portion of the markup language document with a machine learning technique to generate a first dictation corresponding to the first portion of the markup language document, the machine learning technique being trained to establish a relationship between a plurality of training markup language documents and training dictations corresponding to the training markup language documents, the machine learning technique being trained by:
obtaining a first batch of training data comprising a first set of the plurality of training markup language documents and a first set of the corresponding training dictations;
processing the first set of training markup language documents with the machine learning technique to generate estimated dictations for the training markup language documents;
computing a loss function based on a deviation between the estimated dictations for the training markup language documents and the corresponding training dictations; and
updating parameters of the machine learning technique based on the computed loss function; and
replacing the first portion of the markup language document with the first dictation.

18. The non-transitory computer readable medium of claim 17, wherein the markup language document comprises a webpage that is requested by a web browser application implemented on a client device.

19. The non-transitory computer readable medium of claim 17, wherein replacing the first portion comprises replacing the first portion of the markup language document with markup language corresponding to the first dictation.

\* \* \* \* \*